(12) United States Patent
Koski et al.

(10) Patent No.: US 10,941,527 B2
(45) Date of Patent: Mar. 9, 2021

(54) PORTABLE WELD MILLING MACHINE APPARATUS AND METHODS OF USING THE SAME

(71) Applicant: Holland, L.P., Crete, IL (US)

(72) Inventors: Kristopher Koski, Homer Glen, IL (US); Kelly Steck, Gig Harbor, WA (US)

(73) Assignee: Holland, L.P., Crete, IL (US)

( * ) Notice: Subject to any disclaimer, the term of this patent is extended or adjusted under 35 U.S.C. 154(b) by 0 days.

(21) Appl. No.: 16/372,827

(22) Filed: Apr. 2, 2019

(65) Prior Publication Data
US 2019/0226155 A1 Jul. 25, 2019

Related U.S. Application Data

(63) Continuation of application No. 15/442,245, filed on Feb. 24, 2017.
(Continued)

(51) Int. Cl.
| | | |
|---|---|---|
| *E01B 31/13* | (2006.01) | |
| *B23C 3/00* | (2006.01) | |
| *B23Q 9/02* | (2006.01) | |

(52) U.S. Cl.
CPC ............ *E01B 31/13* (2013.01); *B23C 3/005* (2013.01); *B23Q 9/02* (2013.01); *B23C 2215/32* (2013.01); *B23C 2240/16* (2013.01)

(58) Field of Classification Search
CPC ........... B23C 3/005; B23C 3/002; B23C 1/20; B23C 2215/32; B23Q 9/0042;
(Continued)

(56) References Cited

U.S. PATENT DOCUMENTS 1,887,424 A * 11/1932 Perazzoli ................ E01B 31/13
409/178
1,935,484 A * 11/1933 Re Qua ................... E01B 31/15
409/296
(Continued)

FOREIGN PATENT DOCUMENTS

| CN | 103056666 | 4/2013 |
| CN | 204570400 U | 8/2015 |

(Continued)

OTHER PUBLICATIONS

Description EP2412871 (translation) obtained at https://worldwide.espacenet.com/ (last visited Nov. 5, 2019).*
(Continued)

*Primary Examiner* — Ryan C Rufo
(74) *Attorney, Agent, or Firm* — Scherrer Patent & Trademark Law, P.C.; Stephen T. Scherrer; Monique A. Morneault (57) ABSTRACT

A portable rail weld milling machine apparatus comprises a metal frame that incorporates a motor with a rotary carbide tool that is able to lock to a rail or rails for stability. The apparatus houses the required guides and motors to maneuver the tool on a plurality of axes with computer numerical control ("CNC"). The CNC programming is able to control the carbide tool such that the welded rail can be milled to proper profile on the entire running surface, including the top, the field side, and the gauge side of the ball of the rail.

17 Claims, 4 Drawing Sheets

Related U.S. Application Data (60) Provisional application No. 62/299,231, filed on Feb. 24, 2016.

(58) Field of Classification Search
CPC ...... B23Q 9/0007; B23Q 9/0014; B23Q 9/02; E01B 31/13; E01B 31/17; E01B 31/175; E01B 31/15

See application file for complete search history.

(56) References Cited

U.S. PATENT DOCUMENTS

| | | | | |
|---|---|---|---|---|
| 2,132,861 | A * | 10/1938 | Perazzoli | E01B 31/175 451/429 |
| 2,827,836 | A * | 3/1958 | Horth | B23Q 35/122 409/99 |
| 3,327,573 | A | 6/1967 | Prussiano | |
| 3,889,575 | A | 6/1975 | Tabert | |
| 4,178,724 | A * | 12/1979 | Bruno | E01B 31/17 451/347 |
| 4,304,133 | A * | 12/1981 | Feamster, III | B23Q 1/621 73/633 |
| 4,365,918 | A | 12/1982 | Theurer | |
| 4,534,689 | A | 8/1985 | Theurer | |
| 5,032,051 | A | 7/1991 | Gilmore | |
| 5,375,951 | A | 12/1994 | Veale | |
| 5,549,505 | A | 8/1996 | Jaeggi | |
| 6,033,166 | A | 3/2000 | Hampel | |
| 6,669,533 | B2 * | 12/2003 | Huboud-Peron | E01B 31/17 451/11 |
| 7,156,723 | B2 * | 1/2007 | Natarajan | E01B 31/17 451/347 |
| 7,237,309 | B2 | 7/2007 | Nicaise | |
| 1,138,656 | A1 | 5/2015 | Hilliard | |
| 2002/0194722 | A1 | 12/2002 | Galloway | |
| 2013/0039713 | A1 * | 2/2013 | Weidman | B23Q 1/012 409/235 |
| 2013/0189045 | A1 | 7/2013 | Behrens | |
| 2016/0032534 | A1 | 2/2016 | Steck | |
| 2017/0314210 | A1 | 11/2017 | Rungger | |

FOREIGN PATENT DOCUMENTS

| | | | | |
|---|---|---|---|---|
| DE | 20004932 | U1 | 7/2001 | |
| EP | 0148089 | A2 * | 7/1985 | ............ B23C 3/005 |
| EP | 2071078 | | 6/2009 | |
| EP | 2412871 | | 2/2012 | |
| EP | 2412871 | A1 * | 2/2012 | ............ E01B 31/13 |
| EP | 1983100 | | 10/2013 | |
| EP | 2808446 | | 12/2014 | |
| FR | 1288129 | | 3/1962 | |
| GB | 191022670 | | 1/1911 | |
| GB | 179507 | A * | 6/1922 | ............ E01B 31/17 |
| GB | 2121710 | A * | 1/1984 | ............ E01B 31/13 |
| JP | 05-051906 | | 3/1993 | |
| JP | 2002-188101 | | 7/2002 | |
| WO | WO-2012016464 | A1 * | 2/2012 | ............ B23C 3/005 |
| WO | WO-2015014433 | A1 * | 2/2015 | ............ B23D 1/006 |

OTHER PUBLICATIONS

Description EP2071078 (translation) obtained at https://worldwide.espacenet.com/ (last visited Feb. 26, 2020).*

Description EP2808446 (translation) obtained at https://worldwide.espacenet.com/ (last visited Feb. 26, 2020).*

International Search Report and Written Opinion of the International Searching Authority, PCT Pat. App. No. PCT/US2017/019448.

Description EP2808446 (Translation) obtained at https://worldwide.espacenet.com/ (retrieved May 23, 2018).

* cited by examiner

PORTABLE WELD MILLING MACHINE APPARATUS AND METHODS OF USING THE SAME

The present invention claims priority as a continuation application of U.S. patent application Ser. No. 15/442,245, filed Feb. 24, 2017, and under 35 U.S.C. 119 to U.S. Prov. Pat. App. No. 62/299,231, filed Feb. 24, 2016, each titled, "Portable Rail Weld Milling Machine Apparatus and Methods of Using the Same," each of which is incorporated by reference herein in its entirety.

TECHNICAL FIELD

The present disclosure provides a portable rail weld milling machine apparatus. Specifically, the portable rail weld milling machine apparatus comprises a metal frame that incorporates a motor with a rotary carbide tool that is able to lock to a rail or rails for stability. The apparatus houses the required guides and motors to maneuver the tool on a plurality of axes with computer numerical control ("CNC"). The CNC programming is able to control the carbide tool such that the welded rail can be milled to proper profile on the entire running surface, including the top, the field side, and the gauge side of the ball of the rail.

BACKGROUND

Railway rails form a complex web across the United States and the world and are heavily used for transportation of goods and people. Typically, railway transport consists of a track, typically made of parallel steel rails with many cross-ties, on which rolling stock moves. Commonly, rail vehicles known as trains include fixed metal wheels of a specific gauge that engage the parallel rails and move thereon. As the rails are used and age, they must frequently be repaired and/or replaced.

A common way to repair rail lines is to remove a section of a rail to either fix the section or to replace the section with new rail. To do so, a cutting saw typically cuts the rail at specific locations so that the section can be removed. When the section of rail is repaired or when a replacement section is added back, the terminal ends of the section of the rail must be welded to the remaining rail. The weld must simultaneously be strong enough to withstand the pressures of use, and have a profile that allows for the smooth rolling of stock thereon. Indeed, irregularities in the head of a rail may interfere with the proper rolling of rail vehicles thereon.

Rail sections are typically welded together in what is known as a "flash butt-weld," where the terminal sections of rail are abutted to one another, and an arc is drawn between the rail sections causing the ends to melt followed by an axial force, or forging, of the ends together. The forging process forces the excess molten metal out of the joint leaving a bead, or flashing, around the profile of the rail. Alternatively, the rail ends can be joined by an exothermic process whereby a mold is placed around the rail ends and metal is melted over the mold allowing metal to flow into the joint to close the gap between. The exothermic process leaves a flashing around the joint after the molds are removed. In either process, the flashing may or may not be partially removed with a shearing die. The weld flashing, whether sheared or not, tends to be irregular and bumpy in shape and must be smoothed to a smooth running surface that matches the specified running and side surfaces of the rest of the rail.

To smooth the head of a rail, grinding machines are used, typically consisting of rotary tools having grinding stones thereon. Specifically, rail grinding machines comprise a grinding head carrying an abrasive grinding stone mounted to rotate about an axis. Further, rail grinding machines may be capable of up and down movement parallel to its axis of rotation. The rotating stone is lowered to create contact with the rail head, and is typically continually adjusted while being manually moved back and forth in the longitudinal direction of the rail. The rotary grinding tool is often contained within a chassis that is pivoted about a longitudinal axis to restore the rail head profile of the field side and the gauge side of the rail head. Moreover, the chassis and grinding head carried by the chassis may be inclined at will to one side of the rail or the other, starting from a substantially vertical starting position, so as to allow the top face or sides of the rail head to be ground. Oftentimes, the operation of existing rail grinding machines tend to force the operator into an awkward position and placed an undesirable amount of stress on his or her shoulders and back region, causing fatigue over time and enhancing the likelihood of improper restoration of the rail profile. Moreover, using rotary grinding tools in the manner described above may cause the production of a large of amount of sparks that can be thrown in multiple directions, increasing the likelihood of injury and/or damage caused by fire.

The rail grinding machines are designed to grind the head of a rail with the intent to restoring profile of the weld region to match the balance of the length of the rails. Usually, rail profile grinding operations affect both the top face of the rail and the two sides of the rail head (the field side and the gauge side thereof). A need, therefore, exists for an improved apparatus for restoring a rail profile after welding of the same. More specifically, a need exists for an improved apparatus for restoring a rail profile using a portable milling machine.

In addition, a need exists for an improved apparatus for restoring a rail profile after welding of the same that is highly accurate. Moreover, a need exists for an improved apparatus for restoring a rail profile after welding of the same that is easy to operate without causing stress or strain on an operator.

Further, a need exists for an improved apparatus for restoring a rail profile after welding of the same that reduces the possibility of improper profile restoration. Still further, a need exists for an improved apparatus for restoring a rail profile after welding of the same that reduces damage or injury caused by dust and/or sparks.

SUMMARY OF THE INVENTION

The present disclosure provides a portable rail weld milling machine apparatus. Specifically, the portable rail weld milling machine apparatus comprises a metal frame that incorporates a motor with a rotary carbide tool that is able to lock to a rail or rails for stability. The apparatus houses the required guides and motors to maneuver the tool on a plurality of axes with computer numerical control ("CNC"). The CNC programming is able to control the carbide tool such that the welded rail can be milled to proper profile on the entire running surface, including the top, the field side, and the gauge side of the ball of the rail.

A picking point atop the frame is utilized to situate the apparatus over the center of a weld made in rails to be profiled. The picking point is attached to a hydraulically controlled boom affixed to a truck or rail cart. Also situated in the truck or cart is a source for both electric and hydraulic power. The apparatus allows for the proper profiling of the head of the welded rails repeatedly, while at the same time eliminating sparks typically generated by profile grinding rail welds via abrasive stones.

To this end, in an embodiment of the present invention, a rail weld milling machine apparatus is provided. The portable rail weld milling machine apparatus comprises a frame having a milling motor and a milling tool contained therein for operating on a plurality of axes, and the frame further comprises a clamp extending therefrom and configured to engage a rail. In an alternate embodiment of the present invention, the frame comprises at least one arm extending therefrom having a second clamp configured to engage a parallel rail for added stability.

In an embodiment of the present invention, an apparatus for milling a weld on a rail is provided. The apparatus comprises: a frame comprising a first clamp extending from the frame and configured for clamping the frame to a first rail; and a milling head connected to a motor wherein the motor is configured to drive the milling head, the milling head connected to a first linear guide, the linear guide connected to the frame.

In an embodiment, the milling head extends from the motor, and the motor is attached to the linear guide.

In an embodiment, the milling head is connected to a second linear guide.

In an embodiment, the first linear guide is configured to move the milling head in a direction lateral to the rail and the second linear guide is configured to move the milling head in a direction longitudinal to the rail.

In an embodiment, the first linear guide is configured to move the milling head in a direction lateral to the rail and the second linear guide is configured to move the milling head vertically.

In an embodiment, the first linear guide is configured to move the milling head in a direction longitudinal to the rail and the second linear guide is configured to move the milling head vertically.

In an embodiment, the milling head is connected to a third linear guide.

In an embodiment, the first linear guide is configured to move the milling head in a direction lateral to the rail, the second linear guide is configured to move the milling head in a direction longitudinal to the rail, and the third linear guide is configured to move the milling head vertically.

In an embodiment, the milling head is rotatably connected to the first linear guide and configured to be disposed between a vertical position and a horizontal position.

In an embodiment, the apparatus further comprises: an arm extending from the frame; and a second clamp extending from the terminal end of the arm, configured to clamp to a second rail running parallel to the first rail.

In an alternate embodiment of the present invention, a system is provided for milling a weld on a rail comprising: a milling apparatus comprising a frame comprising a first clamp extending from the frame and configured for clamping the frame to a first rail, and a milling head connected to a motor wherein the motor is configured to drive the milling head, the milling head connected to a first linear guide, the linear guide connected to the frame; and a first rail having a weld thereon, wherein the first clamp is clamped to the first rail, and the milling head is positioned over an area of the first rail to be milled.

In an embodiment, the first rail comprises a first rail section and a second rail section and a butt-weld between the first rail section and the second rail section.

In an embodiment, the weld is disposed on a top surface of the rail.

In an embodiment, the milling head moves in three-dimensions.

In an embodiment, the system further comprises: an arm extending from the frame having a second clamp on a terminal end thereof, wherein the second clamp is clamped to a second rail running parallel to the first rail.

In an embodiment, a method of milling a weld on a rail is provided. The method comprises the steps of: providing a milling apparatus comprising a frame comprising a first clamp extending from the frame and configured for clamping the frame to a first rail, and a milling head connected to a motor wherein the motor is configured to drive the milling head, the milling head connected to a first linear guide, the linear guide connected to the frame; providing a first rail having a weld thereon; positioning the frame over the rail; claiming the first clamp to the first rail; positioning the milling head over an area of the first rail to be milled; and milling the area of the first rail including the weld.

In an embodiment, the first rail comprises a first rail section and a second rail section and a butt-weld between the first rail section and the second rail section.

In an embodiment, the weld is disposed on a top surface of the rail.

In an embodiment, the method further comprises: moving the milling head in three dimensions when milling the area of the first rail including the weld.

In an embodiment, the frame comprises an arm extending from the frame having a second clamp on a terminal end thereof, further comprising the steps of: providing a second rail running parallel to the first rail; and clamping wherein the second clamp to a second rail.

It is, therefore, and advantage and objective of the present invention to provide an improved apparatus for restoring a rail profile after welding of the same.

More specifically, it is an advantage and objective of the present invention to provide an improved apparatus for restoring a rail profile using a portable rail weld milling machine.

In addition, it is an advantage and objective of the present invention to provide an improved apparatus for restoring a rail profile after welding of the same that is highly accurate.

Moreover, it is an advantage and objective of the present invention to provide an improved apparatus for restoring a rail profile after welding of the same that is easy to operate without causing stress or strain on an operator.

Further, it is an advantage and objective of the present invention to provide an improved apparatus for restoring a rail profile after welding of the same that reduces the possibility of improper profile restoration.

Still further, it is an advantage and objective of the present invention to provide an improved apparatus for restoring a rail profile after welding of the same that reduces damage or injury caused by dust and/or sparks.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present disclosure provides a portable rail weld milling machine apparatus. Specifically, the portable rail weld milling machine apparatus comprises a metal frame that incorporates a motor with a rotary carbide tool that is able to lock to a rail or rails for stability. The apparatus houses the required guides and motors to maneuver the tool to mill the full raid head profile of various sizes via computer numerical control ("CNC"). The CNC programming is able to control the carbide tool such that the welded rail can be milled to proper profile on the entire running surface, including the top, the field side, and the gauge side of the ball of the rail.

A picking point atop the frame is utilized to situate the apparatus over the center of a weld made in rails to be profiled. The picking point is attached to a hydraulically controlled boom affixed at the rear of a truck or cart. Also situated in the truck or cart is a source for both electric and hydraulic power. The apparatus allows for the proper profiling of the head of the welded rails repeatedly, while at the same time eliminating sparks typically generated by profile grinding rail welds via abrasive stones.

Figure 1:
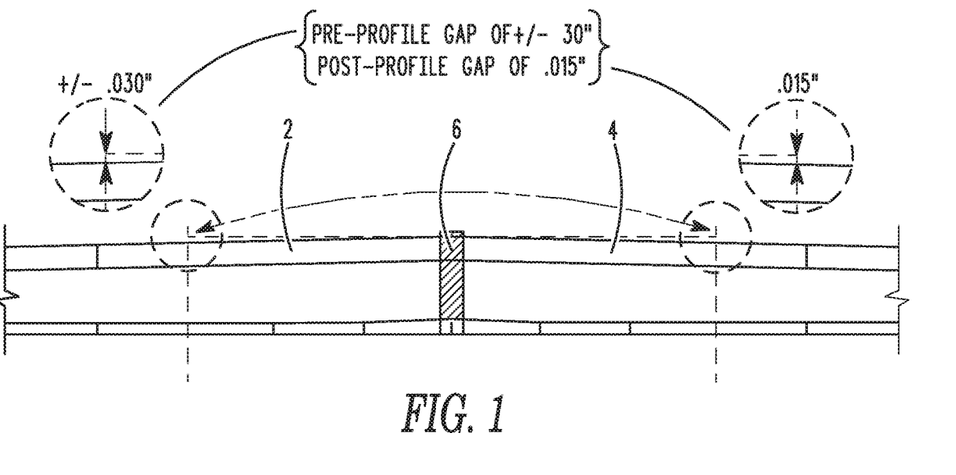
FIG. 1 illustrates a rail having a weld between rail sections in abutment to each other.

Now referring to the figures, wherein like numerals refer to like parts, FIG. 1 illustrates a side view of a first rail section 2 and a second rail section 4 in abutment, with a rail weld 6 in a weld zone disposed at the joint thereof to hold the first rail section 2 firmly with the second rail section 4. Typically, an exothermic weld joins the steel rail sections together. Although the present invention described herein is specific to butt-welds between two rail sections, it should be noted that the present invention may be utilized on other welds or irregularities in rails, and the present invention should not be limited as described herein. For example, frogs and diamonds are typically repaired by building up weld patterns on surfaces, and the present invention may be useful for milling these weld patterns to smooth, regular surfaces.

The rail weld 6, when applied between the rail sections, is typically rough, bumpy or otherwise irregular, and does not provide a smooth running surface within the rail weld zone. The rail weld 6 must typically be reduced and smoothed to provide a smooth surface for rail vehicles.

When a weld is applied to terminal ends of rail sections to join the rail sections together, the weld is typically crowned vertically higher than the linear rail head running surface prior to welding. This is because after the rail is heated from welding, the foot of the rail profile cools more rapidly than the head (being thicker than the foot) thus causing distortion. The vertically higher crown minimizes this and ensures that the running surface of the weld zone is not lower than the running surface, which would make it difficult to correct. As illustrated in FIG. 1, the rail weld 6 may have a pre-profile gap of +/−0.030". Typically, a post-profile gap of +/−0.15" or less is desired to ensure a smooth and safe running surface for the rail weld zone.

Figure 2:
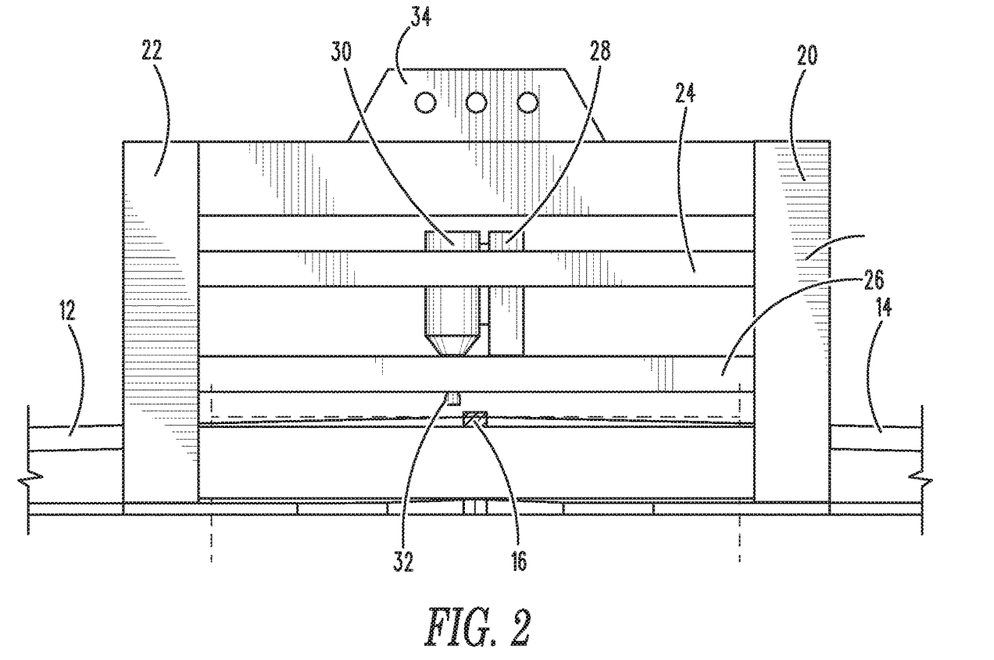
FIG. 2 illustrates a side view of a portable rail weld milling machine apparatus positioned on a rail in an embodiment of the present invention.
Figure 4:
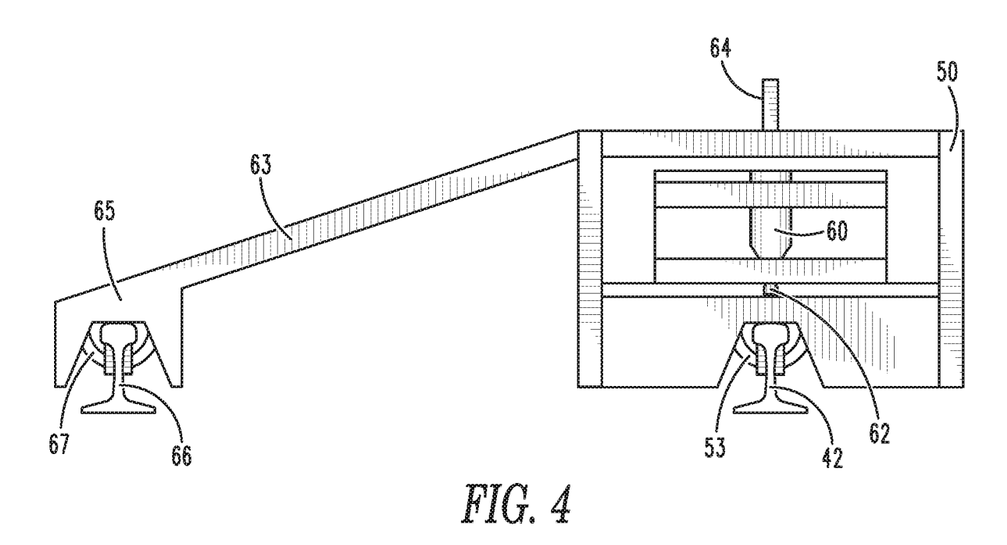
FIG. 4 illustrates a front view of a portable rail weld milling machine apparatus having at least one parallel rail stabilizing arm in an embodiment of the present invention.
Figure 5:
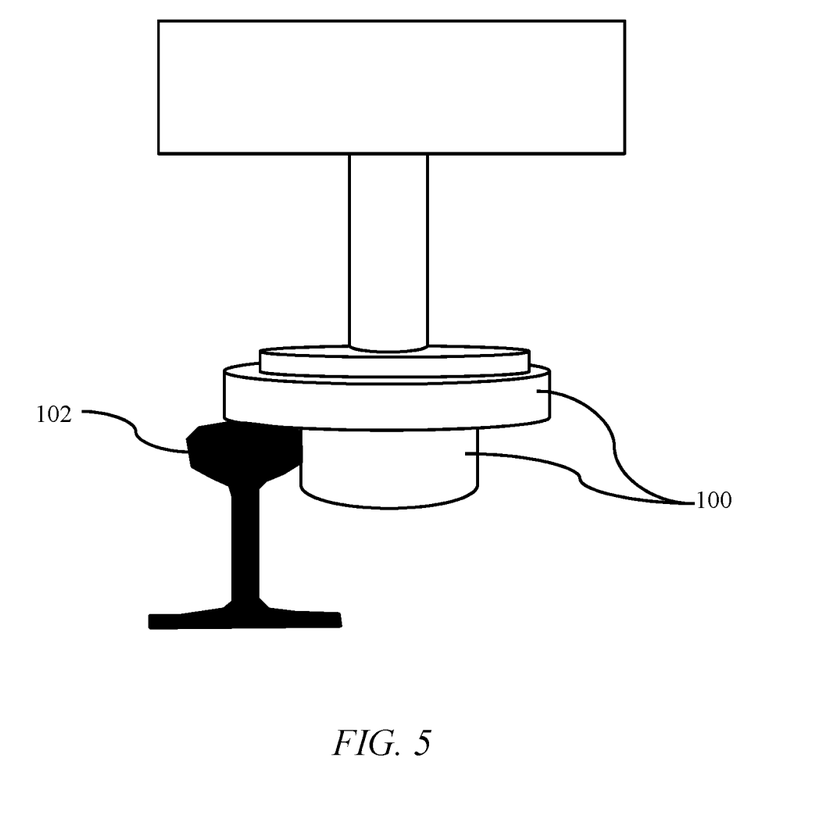

FIG. 2 illustrates a side view of a portable rail weld milling machine apparatus 10 in an embodiment of the present invention. The portable rail weld milling machine apparatus 10 may be positioned over two adjoining rail sections 12, 14 having a rail weld 16 in a rail weld zone. The portable rail weld milling machine apparatus 10 may comprise a frame 20 that may be disposed over and, preferably, clamp to a the rail sections 12, 14, stabilizing the apparatus 10 on the rail sections 12, 14, as illustrated in FIG. 4. The frame 20 may comprise legs 22 and guides 24, 26, 28 for guiding a CNC milling motor 30 and a milling tool 32 on the rail weld 16. Specifically, the milling tool 32 may engage the rail weld 6, thereby milling the rail weld 16 so that the rail weld 16 has a smooth, regular surface. The motor 30 may provide for high-speed rotation of the milling tool 32, which may preferably comprise a carbide tool. The carbide tool may have a size and shape that is useful for smoothing the rail weld 16 and the rail profile surface both on a top thereof, and on the sides of the rail head and rail profile. Specifically, cutting from the carbide tool may preferably be accomplished from both the bottom and the sides of the carbide tool. FIG. 5 illustrates a carbide tool 100, as described herein, that may cut a railroad rail 102 on the top and a side thereof simultaneously, as the carbide tool has a size and shape allowing cutting from the both the bottom and the sides.

Because of the precise control of the milling tool 32 via the motor 30 on the guides 24, 26, 28, the cutting of the rail weld 6 by the milling tool 32 may provide precise smoothing, and may be done autonomously. Specifically, the rail weld 16 and the surrounding rail sections 12, 14 may be analyzed, either by an operator by sight, or via analysis thereof by an automatic system, such as a laser analysis system, to determine how much rail weld 16 to remove, and where to remove the same to provide the proper rail profile.

Specifically, in an embodiment of the present invention, a laser scanning system that may be part of the apparatus 10, or alternatively may be a stand-along system or associated with a different apparatus, may scan the rail weld 16 and the surrounding rail sections 12, 14 to obtain a detailed record of the state of the rail weld. The system may further analyze the scan results to determine where to remove rail weld material and how much to remove to achieve the smooth, regular surface that is necessary. Of course, other probes or scanning systems may be utilized to measure rail welds, and the present invention should not be limited as described herein.

Moreover, the system of the present invention may further retain a record of the scanned results that may be stored for future use. After it is determined how much weld material to remove and from where on the rail weld 16, the milling tool 32 may engage the rail weld 16 and remove the material as provided by either the operator or the system automatically on a plurality of axes (such as, for example, 3 axes or 4 axes, as necessary) using computer numerical control (CNC). The milling tool 32 may move in three dimensions via the guides 24, 26, 28, or other guides not shown, to remove weld material from the top and sides of the rail weld in the head portion of the rail weld zone. After the material is removed, the rail weld may be visually inspected, or scanned again to determine if the proper amount of rail weld material has been removed, or whether further milling is necessary.

As illustrated in FIG. 2, a picking point 34 on a top of the frame 20 may have a connector for connecting to a boom or transfer arm (not shown) that may be disposed on a truck or cart. The boom or transfer arm may allow an operator to easily control placement and/or removal of the apparatus 20 onto the rail at the rail weld 16. Preferably, the boom or transfer arm may be guided by an operator and precisely placed in a proper location, as needed. In addition, the boom or transfer arm may further provide distribution of electric and hydraulic power to the apparatus 10 from a truck or cart, as needed in the operation of the apparatus 10. Of course, it should be noted that a boom or transfer arm may not be necessary, and the apparatus 10 may be a stand-alone apparatus that may be placed on rail sections by operators thereof.

Figure 3:
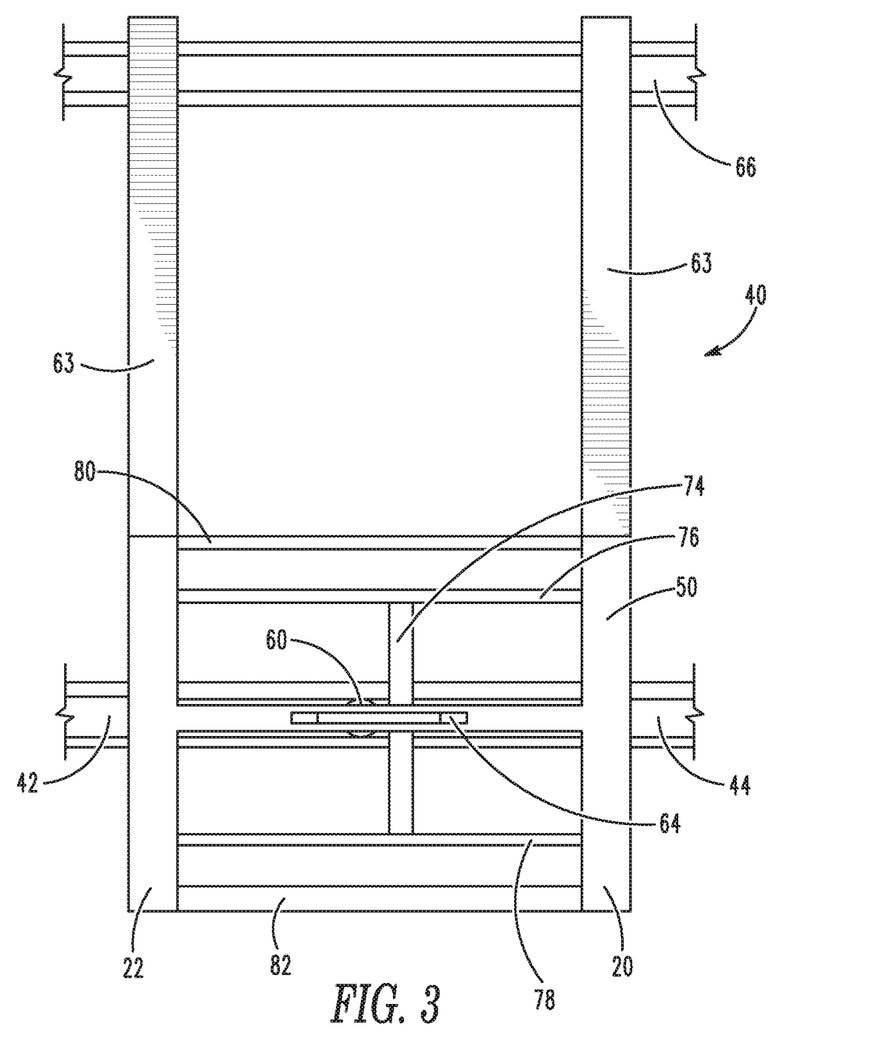
FIG. 3 illustrates a top view of a portable rail weld milling machine apparatus having parallel rail stabilizing arms in an embodiment of the present invention.

Referring now to FIGS. 3 and 4, an alternate embodiment of the present invention is disclosed. Specifically, a portable rail weld milling machine apparatus 40 is illustrated having a frame 50 with a motor 60 and milling tool 62, as described above. The motor 60 and milling tool 62 may be attached to a linear guide 74 disposed and configured laterally to rail sections 42, 44. Moreover, the linear guide 74 may allow the motor 60 and milling tool 62 to traverse in a direction lateral to the rail sections 42, 44. The linear guide may further be attached to longitudinal linear guides 76, 78 disposed on opposite sides of rail sections 42, 44 and configured longitudinal to the rail sections 42, 44, allowing the motor 60 and milling tool 62 to move longitudinal to the rail sections 42, 44. The motor 60 and milling tool 62 may further be attached to a vertical linear guide (not shown in FIG. 3) allowing the motor 60 and milling tool 62 to move upwardly and downwardly as needed. Finally, the motor 60 and milling tool 62 may be rotatably connected to the vertical linear guide (not shown) so that the motor 60 and milling tool 62 may rotate in a lateral direction, allowing the milling tool 62 to be positioned in any position between vertical and horizontal to be able to mill sides of the rail sections 42, 44 and components thereof.

The frame 50 may have one or more clamps 53 disposed thereunder for clamping the frame 50 to rail sections the 42, 44 with the rail weld therebetween. The picking point 64 with the connector may be connected to a boom or transfer arm (not shown) for ease of moving the same, although, again, the apparatus 40 may be a stand-alone apparatus moved into position by operators without the aid of a boom or transfer arm. Extending from a side of the frame 50 may be one or more arms 63, each having a housing 65 on an end thereof with a clamp 67 that may engage a rail 66 disposed parallel to the rail sections 42, 44, thus providing enhanced stability for the apparatus 40 as it mills the rail weld 46.

Thus, the embodiments of the present invention disclosed herein provide quality control and quality assurance for the rail profiles that have been welded together, thereby ensuring that the rail profiles are sufficiently smooth and regular for rail vehicles to roll thereon without danger or risk. The milling process may be precisely controlled, and may prevent or reduce the creation of dust or sparks, reducing or eliminating the need for special breathing protection and protective gear by operators thereof. Automatic milling of the rail weld provides a more accurate finished profile, and eliminates stress and strain on operators. Indeed, operators may perform other tasks during the milling thereof. Moreover, dimensional records of the rail weld, pre-profile and post-profile, may be maintained and stored for quality and safety.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. An apparatus for milling a weld on a first railroad rail that is parallel to a second railroad rail comprising:
    a frame comprising a first clamp extending from the frame and configured for clamping the frame to the first railroad rail on a first side of the weld, the frame comprising a second clamp extending from the frame and configured for clamping the frame to the first railroad rail on a second side of the weld;
    an arm extending from the frame and immovable relative to the frame at all times, the arm disposed at a sloped angle in a front view of the apparatus and substantially perpendicular in a top view of the apparatus, and a third clamp extending from the arm configured to clamp to the second railroad rail, wherein the first clamp, second clamp and the third clamp are configured to rigidly hold the frame in a stationary position relative to the first and second railroad rails;
    first and second parallel linear guides running longitudinally and parallel to the first and second railroad rails and rigidly attached to the frame;
    a third linear guide running laterally and perpendicular to the first and second railroad rails, the third linear guide movably attached to the first and second parallel linear guides so that the third linear guide travels in a direction longitudinally and parallel to the first and second railroad rails;
    a milling tool comprising a milling head and a motor wherein the motor is configured to drive the milling head, the milling tool connected to the third linear guide running laterally and perpendicular to the first and second railroad rails so that the milling tool travels in a direction laterally and perpendicular to the first and second railroad rails and, via movement of the third linear guide on the first and second parallel linear guides, longitudinally and parallel to the first and second railroad rails,
    wherein the milling head is configured to mill the weld on the first railroad rail.

2. The apparatus of claim 1 wherein the milling head is connected to a fourth linear guide.

3. The apparatus of claim 2 wherein the fourth linear guide is configured to move the milling head vertically.

4. The apparatus of claim 1 wherein the first clamp comprises a first clamp arm and a second clamp arm, wherein the first clamp arm holds the first rail on a first side of the web beneath the railhead thereof and the second clamp arm holds the first rail on a second side of the web beneath the railhead thereof.

5. The apparatus of claim 1 wherein the third clamp comprises a first clamp arm and a second clamp arm, wherein the first clamp arm holds the second rail on a first side of the web beneath the railhead thereof and the second clamp arm holds the second rail on a second side of the web beneath the railhead thereof.

6. The apparatus of claim 1 wherein the first linear guide and the second linear guide are disposed on opposite sides of the first railroad rail.

7. A method of milling a weld on a rail comprising the steps of:

providing a milling apparatus according to claim 1
positioning the frame over the first railroad rail;
clamping the first clamp to the first railroad rail;
clamping the third clamp to the second railroad rail running parallel to the first railroad rail;
positioning the milling head over an area of the first railroad rail to be milled; and
milling the area of the first railroad rail including the weld.

8. The method of claim 7 wherein the first railroad rail comprises a first rail section and a second rail section and a butt-weld between the first rail section and the second rail section.

9. The method of claim 7 wherein the weld is disposed on a top surface of the first railroad rail.

10. The method of claim 7 further comprising: moving the milling head in three axes perpendicular to each other when milling the area of the first railroad rail including the weld.

11. A system for milling a weld on a rail comprising:
a first railroad rail comprising a weld and a second railroad rail running parallel to the first railroad rail;
a milling apparatus comprising a frame comprising a first clamp extending from the frame and clamped to the first railroad rail having the weld thereon, and a milling head connected to a motor wherein the motor is configured to drive the milling head, the milling head connected to a first linear guide running laterally to the first and second railroad rails, wherein the milling head is configured to mill the weld on the first railroad rail, and further wherein the first linear guide is connected to a second linear guide running longitudinally to the first and second railroad rails wherein the first linear guide, the milling head and the motor are configured to travel together along the second linear guide; and
an arm extending from the frame and immovable relative to the frame at all times, the arm disposed at a sloped angle in a front view of the milling apparatus and substantially perpendicular in a top view of the milling apparatus, the arm having a second clamp extending therefrom, wherein the second clamp is clamped to the second railroad rail running parallel to the first railroad rail,
wherein the first clamp and the second clamp rigidly hold the milling apparatus in a stationary position relative to the first and second railroad rails when the milling head mills the weld on the first rail.

12. The system of claim 11 wherein the first railroad rail comprises a first rail section and a second rail section and a butt-weld between the first rail section and the second rail section.

13. The system of claim 11 wherein the weld is disposed on a top surface of the first railroad rail.

14. The system of claim 11 wherein the milling head is capable of moving along three axes perpendicular to each other.

15. The system of claim 11 wherein the first clamp comprises a first clamp arm and a second clamp arm, wherein the first clamp arm holds the first rail on a first side of the web beneath the railhead thereof and the second clamp arm holds the first rail on a second side of the web beneath the railhead thereof.

16. The system of claim 11 wherein the second clamp comprises a first clamp arm and a second clamp arm, wherein the first clamp arm holds the second rail on a first side of the web beneath the railhead thereof and the second clamp arm holds the second rail on a second side of the web beneath the railhead thereof.

17. The system of claim 11 wherein the second linear guide and a parallel third linear guide are disposed on opposite sides of the first railroad rail.

\* \* \* \* \*